(No Model.)
A. F. STINSON & J. S. SANDERS.
COMBINED HOE AND RAKE.
No. 351,296. Patented Oct. 19, 1886.
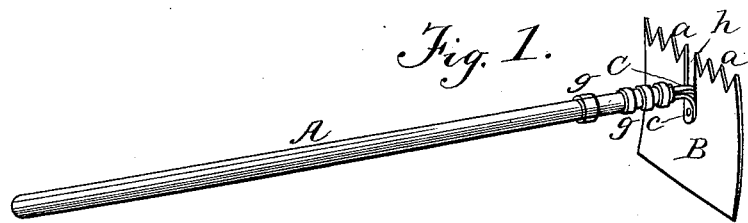
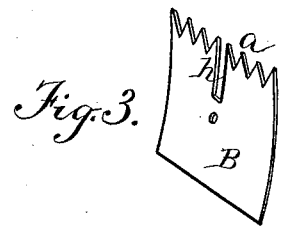
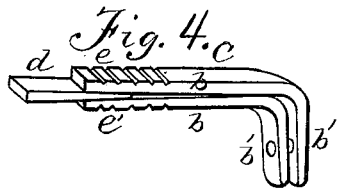
Witnesses:
A. le Rawlings
W. E. Chaffee
Inventors:-
John Sturde Sanders,
Albert Franklin Stinson,
by Johnson and Johnson,
Attys.

UNITED STATES PATENT OFFICE.

ALBERT FRANKLIN STINSON AND JOHN STURDE SANDERS, OF GRAND JUNCTION, TENNESSEE.

COMBINED HOE AND RAKE.

SPECIFICATION forming part of Letters Patent No. 351,296, dated October 19, 1886.

Application filed February 17, 1886. Serial No. 192,274. (No model.)

*To all whom it may concern:*

Be it known that we, ALBERT FRANKLIN STINSON and JOHN STURDE SANDERS, citizens of the United States, residing at Grand Junction, in the county of Hardeman and State of Tennessee, have invented new and useful Improvements in Combined Hoe and Rake, of which the following is a specification.

Our improvement relates to improvements in gardening implements; and the said improvements are specially directed to means for fastening either a combined hoe and rake to its handle or to fastening hoes or rakes proper. This novel construction is hereinafter described with reference to the accompanying drawings, in which—

Figure 1 represents a view in perspective of our combined hoe and rake; Fig. 2, a longitudinal section; Fig. 3, a perspective of the blade as detached from the handle, and Fig. 4 an enlarged detail of the shank proper for fastening the blades.

In the drawings, A is the wooden handle, and B the blade. This blade is preferably curved, as shown, and is made with a sufficient number of rake-teeth, $a\ a\ a$, upon one end, its other end being adapted for use as a hoe. Simply reversing these ends by a turn of the handle converts the implement either into a rake or hoe. The fastening is of this construction—that is, the securement of the handle to the blade by a shank which is of peculiar construction.

The shank C is of two bent parts, $b\ b$, which embrace the blade at the middle slot, $h$, of the blade B, which is opened at its toothed edge upon its two faces, and are secured thereto by a rivet or bolt, $c$, or a suitable equivalent. This bent shank C thus parted is held together in the handle by driven wedge $d$, and each part $b$ has upon its surface holding-notches $e\ e'$, as shown in Fig. 4. This shank C $b\ b\ b$ is inserted into a bored opening, $f$, in the end of handle A, and its notched end grips the wood of the handle upon the inner periphery of said opening. For securement of said shank to the handle further, bands $g\ g\ g$ are placed on hot and left to shrink upon the wood by cooling. The bent ends $b'$ of the parts $b\ b$ of the shank C lap a considerable distance down each side of the blade, and through blade and divided shank ends there passes the fastening bolt or rivet.

The divided shank, with the wedge between the shank ends, is inserted into the handle-opening $f$ after the bands $g$ are placed upon the handle, so as to prevent the latter from being split in driving the shank home. As the shank is thus driven its wedge, striking the inner end of the handle-socket, is thereby driven farther in between the shank parts, and the latter are thereby forced farther apart with their notches into the wood. The bent ends $b'$ of the shank are turned at right angles to the latter, and are set upon the blade within the slot, and it is the latter which allows the fastening of the two-part shank to the blade, while the action of the wedge and the shrinking of the bands upon the handle end give a firm fastening of the shank ends $b$ within the bore of the handle without piercing the handle by rivets.

We claim—

1. The combination, with the hoe-blade B, having the rake-teeth $a\ a\ a$ and the slot $h$, open at the edge of said blade, of two-part embracing-shank C and the handle, substantially as described.

2. The combination, with the blade B and shank C, consisting of two parts, $b\ b$, each having a bent end, $b'\ b'$, and notches $e\ e'$, as described, of a wedge, $d$, the fastening-bolt $c$, and the handle A, and shank on blade $g$, all constructed and arranged substantially as described.

In testimony whereof we have hereunto set our hands in the presence of two subscribing witnesses.

ALBERT FRANKLIN STINSON.
JOHN STURDE SANDERS.

Witnesses:
J. R. WEBB,
SAM. MITCHELL.